(12) United States Patent
Zhang et al.

(10) Patent No.: US 12,038,904 B2
(45) Date of Patent: Jul. 16, 2024

(54) DEVICE AND METHOD FOR ANOMALY DETECTION

(71) Applicant: Robert Bosch GmbH, Stuttgart (DE)

(72) Inventors: Dan Zhang, Leonberg (DE); Robin Tibor Schirrmeister, Freiburg (DE); Yuxuan Zhou, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 354 days.

(21) Appl. No.: 17/181,473

(22) Filed: Feb. 22, 2021

(65) Prior Publication Data

US 2021/0286800 A1    Sep. 16, 2021

(30) Foreign Application Priority Data

Mar. 10, 2020   (EP) .................................... 20162147

(51) Int. Cl.
*G06F 16/23*     (2019.01)
*G05B 13/02*     (2006.01)
*G06N 20/00*     (2019.01)

(52) U.S. Cl.
CPC ..... *G06F 16/2365* (2019.01); *G05B 13/0265* (2013.01); *G06N 20/00* (2019.01)

(58) Field of Classification Search
CPC .. G06F 16/2365; G06N 20/00; G05B 13/0265
USPC ........................................ 700/1–89, 275–281
See application file for complete search history.

(56) References Cited

U.S. PATENT DOCUMENTS

| | | | |
|---|---|---|---|
| 7,248,789 B2* | 7/2007 | Abe ....................... | G11B 20/18 386/E5.052 |
| 7,876,907 B2* | 1/2011 | Kawada ........... | H04N 21/44209 348/192 |
| 7,937,243 B2* | 5/2011 | Yen ........................ | G06N 20/00 707/804 |

(Continued)

OTHER PUBLICATIONS

Scheirer, Eric, and Malcolm Slaney. "Construction and evaluation of a robust multifeature speech/music discriminator." 1997 IEEE international conference on acoustics, speech, and signal processing. Vol. 2. IEEE, 1997.pp. 1331-1334 (Year: 1997).*

(Continued)

*Primary Examiner* — Satish Rampuria
(74) *Attorney, Agent, or Firm* — NORTON ROSE FULBRIGHT US LLP; Gerard A. Messina (57) ABSTRACT

A computer-implemented method for classifying whether an input signal, which comprises image and/or audio data, is anomalous or not with respect to a second data distribution using an anomaly classifier. The method includes: providing the input signal to the anomaly classifier; in the anomaly classifier, providing the input signal to a reference detector and a second detector; obtaining a reference value from the reference detector based on the input signal, the reference value characterizing the likelihood of the input signal to belong to a reference data distribution; obtaining a second value from the second detector based on the input signal, the second value characterizing the likelihood of the input signal to belong to the second data distribution; and providing an output signal, which characterizes a classification of the input signal as anomalous or not based on a comparison of the reference value and the second value.

19 Claims, 8 Drawing Sheets

(56) References Cited

U.S. PATENT DOCUMENTS

| | | | | |
|---|---|---|---|---|
| 10,541,978 | B2* | 1/2020 | Kapoor | H04L 63/0414 |
| 11,562,032 | B1* | 1/2023 | Stewart | G06Q 50/01 |
| 2011/0106539 | A1* | 5/2011 | Rhoads | G10L 19/018 |
| | | | | 704/E11.001 |
| 2017/0024877 | A1 | 1/2017 | Versace et al. | |
| 2017/0279848 | A1* | 9/2017 | Vasseur | H04W 12/02 |
| 2021/0064597 | A1* | 3/2021 | Mac Manus | G06F 16/215 |

OTHER PUBLICATIONS

Wang, Yongjin, and Ling Guan. "Recognizing human emotional state from audiovisual signals." IEEE transactions on multimedia 10.5 (2008):pp. 936-946. (Year: 2008).*

Heckbert, Paul. "Color image quantization for frame buffer display." ACM Siggraph Computer Graphics 16.3 (1982):pp. 297-307. ( Year: 1982).*

O'Shea, Timothy James, Tamoghna Roy, and T. Charles Clancy. "Over-the-air deep learning based radio signal classification." IEEE Journal of Selected Topics in Signal Processing 12.1 (2018): pp. 168-179. (Year: 2018).*

Han, Junwei, et al. "Advanced deep-learning techniques for salient and category-specific object detection: a survey." IEEE Signal Processing Magazine 35.1 (2018): pp. 84-100. (Year: 2018).*

Naseer, Sheraz, et al. "Enhanced network anomaly detection based on deep neural networks." IEEE access 6 (2018): pp. 48231-48246. (Year: 2018).*

Weng, Lilian: "Flow-based Deep Generative Models", Lil'Log, https://lilianweng.github.io/lil-log/2018/10/13, accessed Oct. 13, 2018, pp. 1-18.

Joan Serrà, et al., "Input Complexity and Out-Of-Distribution Detection With Likelihood-Based Generative Models," Cornell University, 2020, pp. 1-15. < https://arxiv.org/pdf/1909.11480. pdf> Downloaded Feb. 19, 2021.

Laube, et al.: "What to expect of hardware metric predictors in NAS," AutoML Conf. (2022), pp. 1-15, XP93057558.

Saha, et al.: "Real-time robot path planning from simple to complex obstacle patterns via transfer learning of options," Autonomous Robots 43(2019), pp. 2071-2093.

Yeo and Bae: "Multiple flow-based knowledge transfer via adversarial networks," Electric Letters 55(18), (2019), pp. 989-992.

* cited by examiner

DEVICE AND METHOD FOR ANOMALY DETECTION

CROSS REFERENCE

The present application claims the benefit under 35 U.S.C. § 119 of European Patent Application No. EP 20162147.1 filed on Mar. 10, 2020, which is expressly incorporated herein by reference in its entirety.

FIELD

The present invention relates to a method for detecting anomalies, a method for training an anomaly detector, a method for operating an actuator, a computer program, a machine-readable storage medium, a control system, and a training system.

BACKGROUND INFORMATION

"Input complexity and out-of-distribution detection with likelihood-based generative models", Joan Serrà, David Álvarez, Vicenç Gómez, Olga Slizovskaia, José F. Núñez, Jordi Luque, 2019, arXiv describes a method for anomaly detection using a PNG compression.

SUMMARY

Machine-learning-based classifiers outperform rule-based systems in almost all areas. They are, however, very much dependent on the data that was used during training. Consider, for example, a classifier, e.g., a neural network, which may be used as part of a perception pipeline of an at least partially autonomous vehicle, wherein the classifier classifies the surroundings of the vehicle based on the sensors, e.g., a camera sensor, and the vehicle is operated in accordance with the obtained classification. If, for example, the classifier was trained using day-time images only, it can be expected that it will not perform acceptably when presented with night-time images.

Classifiers are typically trained with data from a predefined distribution. For example, the above mentioned classifier has been trained with images from the distribution of day-time images. It may be inferred from statistical learning theory that a classifier's performance of correctly classifying a given image can only be generalized to new data, i.e., data the classifier is presented with after training, e.g., during operation, if the new data stems from the same distribution as did the training data.

Especially when using a classifier for safety-critical use cases, it is therefore of the utmost importance to detect situations the classifier has not been trained for, i.e., for which there exists no training data. These situations can be understood to be anomalies with respect to the training data.

If anomalies can be detected, it can serve as valuable information to, e.g., initiate additional measures. Given the example from above, if an anomaly was detected, it would be possible to, e.g., reduce autonomous driving functionality and/or warn an operator and/or driver of the car. Being able to detect anomalies hence improves the performance and safety of the entire system.

An advantage of a method in accordance with an example embodiment of the present invention is that it increases the performance for classifying an input signal as anomalous or not. This characteristic can, for example, be used to increase the performance of a supervision system of a classifier as described above.

In a first aspect, the present invention is concerned with a computer-implemented method for classifying, whether an input signal, which comprises image and/or audio data, is anomalous or not with respect to a second data distribution using an anomaly classifier, wherein the anomaly classifier uses a reference detector and a second detector. In accordance with an example embodiment of the present invention, the method for classifying comprises the following steps:

Providing the input signal to the anomaly classifier;

In the anomaly classifier, providing the input signal to the reference detector and the second detector, wherein the reference detector comprises a generative model of a reference data distribution and the second detector comprises a generative model of the second data distribution;

Obtaining a reference value from the reference detector based on the input signal, wherein the reference value characterizes a likelihood of the input signal to belong to the reference data distribution;

Obtaining a second value from the second detector based on the input signal, wherein the second value characterizes a likelihood of the input signal to belong to the second data distribution;

Providing an output signal, which characterizes a classification of the input signal as anomalous or not based on a comparison of the reference value and the second value.

The term data distribution can be understood as a probabilistic data distribution known from the field of statistics. Alternatively, the data distribution may be understood as an empirical data distribution. In both cases, the data comprised in the input signal can be considered a sample of a random variable with a specific data distribution. For example, a dataset, e.g., of images, can be viewed as a sample which has been generated by a probabilistic data distribution.

It can be further understood that an anomalous datum is an outlier with respect to a predefined data distribution. The predefined data distribution may be represented by a sample dataset, in which case an anomaly can be considered a datum which does not contain content which is typical for the dataset. For example, an image of a vehicle may be an outlier with respect to a dataset of images showing pedestrians.

Alternatively, the data distribution may be a probabilistic data distribution. In this scenario, an anomaly can be considered a datum, which has low density if the predefined data distribution is a continuous probability distribution or low probability if the predefined data distribution is a discrete probability distribution.

In most cases, it is difficult to obtain information on the characteristics of a data distribution, especially information on the probability density function in case of a continuous probability distribution or the probability mass function of a discrete probability distribution. This information, however, can be of high importance, for example, when determining if a given datum is an anomaly with respect to the data distribution.

Consider, for example, the perception pipeline of an at least partially autonomous vehicle. The perception pipeline may comprise a classifier, which is configured to detect objects around the vehicle based on, e.g., camera images. Information about surrounding objects may, for example, be used for determining a collision-free trajectory of the vehicle. In turn, the obtained trajectory can be used to obtain driving commands for the actuators of the vehicle, which in turn can autonomously maneuver the vehicle. It can be envisioned that the classifier has been trained with data such that it enables the classifier to detect other road participants.

In this example, misclassification of anomalous data may have a severe impact on obtaining a collision-free trajectory. In the case of anomalous data, it may be possible that, e.g., other road participants are not detected and a trajectory is planned which leads through a misdetected road participant. However, when using an anomaly detector, the anomalous data can be detected and counter measures can be initiated.

This may include the termination of the autonomous driving behavior and a handover to a driver or an external operator as well as a notification of the driver and/or the external operator about the anomalous event.

In general, determining, whether a given datum is an outlier with respect to the training data of a classifier, may require obtaining information about the probability density function of the random variable, which generated the training data. This can be achieved by using, e.g., conventional parametric models of data distributions, such as a Normal distribution, or more advanced models such as flow-based machine learning models. In both cases, a chosen model can be fit to the desired data by, e.g., maximum likelihood estimation. This way, a model of the data distribution can be obtained which in turn can be used to assess the likelihood of a new datum having been generated by the data distribution.

When dealing with high-dimensional data such as images, however, simple parametric models do not have the capacity to model the data distribution accurately. Instead, machine learning models such as flow-based models may be used in order to model the data distribution of high-dimensional data. Flow-based models currently perform the best in modelling such distributions.

However, even sophisticated models, such as flow-based machine learning models, may provide inaccurate anomaly detections when estimating the density of a single random variable only.

In accordance with an example embodiment of the present invention, an anomaly classifier is used, which comprises two data distribution models (called reference data distribution and second data distribution hereinafter) and compares whether it is more likely for the data comprised in the input signal to have been generated by a reference data distribution or by a second data distribution.

The reference data distribution may be understood as a general distribution (e.g., the distribution of images that can be recorded using a camera) while the second data distribution can be understood as a specific data distribution (e.g., all images that were recorded on a highway for training a classifier). The specific data distribution can be understood to comprise data from a specific domain while the general data distribution can be understood to comprise data from a variety of different domains, possibly including the specific domain.

Using this approach can therefore be understood as answering the question whether a datum is more likely to have been generated by a reference data distribution (i.e., a general data distribution) or the second data distribution (i.e., a specific data distribution). If a datum is considered more likely to have been generated by the reference distribution it can be considered an outlier, i.e., anomaly with respect to the second data distribution as it was more likely generated by another distribution (i.e., the reference data distribution).

An advantage of the anomaly classifier in accordance with an example embodiment of the present invention is that it is able to detect anomalies with a much higher precision.

In addition, the method may be used to further classify an anomaly. For example, consider the case of an input datum being assigned low likelihood for both reference and second data distribution. In this case, the datum can be considered to be unlikely in general. When using sensor-based data, this may hint at a malfunction of the sensor device used for recording the datum. If such a situation is encountered, the sensor device may, e.g., be flagged for inspection and/or removal by a technician.

The method in accordance with an example embodiment of the present invention can be used in order to supervise other classifiers during operation (see example above). Using this approach, the combined system of anomaly detection and classifier allows for a better performance and hence a safer operation of the overall system.

In general, the anomaly classifier may receive input signals, which can comprise images of various modalities, especially sensor image data (or at least parts thereof) as provided by video, radar, LIDAR and/or ultra-sonic sensors as well as images provided by thermal cameras. Alternatively or additionally, it can be envisioned that the input signal comprises image data obtained from a medical imaging device such as an x-ray machine, a CT scanner or a PET scanner. Alternatively or additionally, the input signal may also comprise audio signals as provided by one or more microphones.

An input signal may be provided by a sensor directly. Alternatively or additionally, input signals may also be provided by some form of storage unit or plurality of storage units, e.g., a hard drive and/or a flash drive and/or a solid state disk.

Alternatively or additionally, it can be envisioned that an input signal may comprise synthetically generated or computer-generated data, which was obtained by, e.g., a model-based approach, such as a physical rendering engine or an audio synthesizer, or a generative machine-learning model such as a Generative Adversarial Network.

In the first aspect of the present invention, the reference detector comprises a generative model of the reference data distribution and/or the second detector comprises a generative model of the second data distribution.

The anomaly classifier, like any machine learning-based classifier, may misclassify the input signal, e.g., classify it as anomalous when really it was not.

Therefore, it is of high importance to obtain as high of an anomaly classification performance as possible. In this sense, performance may be understood as a measure for how often the anomaly classifier is able to correctly predict whether an input signal is anomalous or not. The performance of the anomaly classifier in large parts depends on the performance of the reference detector and the second detector to correctly predict the likelihood of belonging to the reference data distribution and the likelihood of belonging to the second distribution respectively.

The advantage of using generative models is that they are the best performing models for learning to predict these kinds of likelihoods. They can be used effectively to learn the characteristics of a data distribution while requiring no or only minimal prior knowledge about the distribution. Compared to rule-based approaches, this enables generative models to model the distribution more accurately. In turn, this leads to a higher anomaly detection rate of the anomaly classifier.

In the first aspect, in accordance with an example embodiment of the present invention, the output signal characterizes the input signal as anomalous if the reference value exceeds the second value by a predefined margin value.

An advantage of this approach is that the margin value controls the anomaly classification rate with respect to a desired behavior. For example, a medical application using the anomaly detector in order to detect anomalous images obtained from, e.g., an x-ray machine, the anomaly detector being used as an aiding method for a physician. Here, it would be desirable to err on the safe side and have the anomaly classifier rather predict a non-anomalous image as anomalous than the other way around as this reduces the risk of a medical condition to go unnoticed. This behavior would correspond to a low margin value. In contrast, when using the anomaly classifier as supervision algorithm as part of an automated personal assistant, e.g., a robot, it may reduce the user experience if the assistant rather classifies a non-anomalous audio signal as anomalous and refuses service compared to the other way around. Here, it would be desirable for the anomaly classifier to rather err on the side of classifying an anomalous input as non-anomalous. This would correspond to choosing a higher margin value compared to the previous example.

In both scenarios, the margin value can be used to trade sensitivity, i.e., the ability to detect all anomalous input signals, for specificity, i.e., the ability to correctly predict an input signal as anomalous. This can be done on a per-application basis. The approach hence further improves the performance of the anomaly detector with respect to a desired behavior of the entire system comprising the anomaly detector.

In the first aspect of the present invention, the reference detector and/or the second detector may comprise a flow-based generative machine-learning model.

Flow-based machine learning models can generally be understood as a special form of probabilistic machine learning model which can transform input signals into a latent representation and vice versa without loss of information. Flow-based models can be seen as a method for transforming the data distribution of the input signal into a predefined data distribution. They achieve this without requiring explicit knowledge about the data distribution of the input signal. The likelihood value of the input signal with respect to the input signal distribution can be effectively inferred from the likelihood value of the latent representation with respect to the predefined data distribution. As flow-based models are bijective, the transformation to the latent space can be seen as a lossless compression of the input signal.

Flow-based models typically comprise layers in the form of a neural network. The layers may be organized such that a first layer provides an output to a second layer. In this example, the first layer provides an output $z_i$, which is forwarded to the second layer in order to provide an output $z_{i+1}$. The output of the last layer $z_{last}$ can be used as output of the flow-based model, while the input signal x may be used as input to the flow-based model. The layers may comprise parameters, which can be adapted during training of the flow-based model in order to obtain a desired output $z_{last}$.

The likelihood p(x) of the input signal can be obtained from a flow-based model based on the likelihood $p(z_{last})$ according to $$\log p(x) = \log p(z_{last}) + \log\left|\det\left(\frac{\partial z_{last}}{\partial x}\right)\right|.$$

Flow-based models can be trained in an unsupervised fashion meaning they only require data without the need for manually or automatically obtained labels. This can, for example, be achieved by adapting the parameters such that the output $z_{last}$ follows a predefined probability distribution, preferably a standard normal distribution.

Compared to other machine learning-based models, such as, e.g., variational auto-encoders, which can only perform approximate inference, flow-based models are inherently constructed to perform exact inference of the likelihood of the input signal. This gives flow-based models, such as, e.g., GLOW or RealNVP, the advantage of currently being the best performing approaches for modeling high-dimensional data distributions. In the context of this invention, this performance improves the ability of the reference detector and/or second detector to accurately represent the respective data, hence predicting highly accurate likelihood values. In turn, this leads to a higher performance of the anomaly detector.

Therefore, the likelihood to belong to the reference distribution may be obtained based on a likelihood of one or more intermediate layer of the reference detector and/or the likelihood to belong to the second distribution is obtained based on a likelihood of one or more intermediate layer of the second detector.

When using a flow-based model, each layer of the model may provide an output $z_i$ which can be interpreted as representation of the input x to the model. Each of these representations may capture features with an increasing amount of information. While the first layers may provide information about edges and colors, the later layers may capture more abstract information such as shapes of objects.

This information may be used to enrich the information obtained from $z_{last}$. For example, the log-likelihood of obtaining x may be defined according to $$\log p(x) = \sum_i \log p(z_i) + \log\left|\det\left(\frac{\partial z_i}{\partial x}\right)\right|,$$

where i iterates over all indices of layers, which shall be used as additional information.

An advantage of this approach is that when employed for the reference detector and/or second detector the detector or detectors are able to draw information from low-level features as well as high-level features. In turn, this increases the performance of the respective detector for which this approach is used.

Therefore, the anomaly classifier (60) may also be used to supervise an application-specific classifier (70), wherein the application-specific classifier (70) has been trained with data from the second data distribution and receives the input signal (x).

An advantage of this approach is that certain errors of the application-specific classifier can be compensated for by the anomaly classifier. For example, consider the application-specific classifier is used as part of a perception pipeline of an autonomous vehicle for detecting objects around the autonomous vehicle as presented above. As is known from statistical learning theory, the application-specific classifier performs worse on data, which can be considered out of distribution with respect to the second distribution. The term "out of distribution" refers to data which is very unlikely under the data distribution of the second dataset.

If an input signal comprises out of sample data with respect to the second data distribution, the application-specific classifier is very likely to misclassify it as the application-specific classifier was trained with the second dataset. However, the anomaly classifier is able to pick up, that the input signal comprises out of distribution data.

This information may be used downstream in order to include other measures. In the example presented above, the autonomous vehicle may inform its passengers and/or operators about the anomalous data and that a safe autonomous driving mode cannot be guaranteed anymore. Alternatively or additionally, it may cancel any current autonomous driving behavior and initiate a handover to a driver or an operator. In both cases, the overall performance of the entire system is improved by the supervision of the anomaly classifier.

Therefore, in accordance with an example embodiment of the present invention, the input signal is based on a sensor signal comprising data from a sensor and/or an actuator control signal is determined based on the output signal of the anomaly classifier for controlling an actuator.

An advantage of this approach is that the actuator can be controlled safer, more precisely and with a higher performance. Consider the example using the autonomous vehicle. The entire driving behavior of the vehicle is enabled to perform better due to drawing information from the anomaly detector. In addition, using the anomaly classifier likely results in the vehicle having to perform less emergency maneuvers which in turn reduces the wear on parts of the car like, e.g., the brakes.

In the first aspect, in accordance with an example embodiment of the present invention, the actuator controls an at least partially autonomous robot and/or a manufacturing machine and/or an access control system and/or an automated personal assistant and/or a surveillance system and/or an imaging system.

An advantage of using an anomaly classifier for these kinds of systems is similar to the autonomous vehicle in that it reduces wear on the system parts.

For example, the anomaly classifier may be used for detecting manufactured parts which are, e.g., broken or otherwise insufficient. If such a part is detected, the manufacturing machine automatically sorts it into a bin designated for inspection by a human being. The increased performance of the anomaly classifier enables the machine to have less false positives when sorting out parts. This reduces wear on the machine as well as manual inspection labor.

In a second aspect, the present invention relates to a computer-implemented method for training an anomaly classifier as explained above, wherein the method comprises the steps of:
Training the reference detector in an unsupervised fashion on a reference dataset, wherein the reference dataset is a sample of the reference data distribution;
Training the second detector in an unsupervised fashion on a second dataset, wherein the reference dataset is a sample of the second data distribution.

An advantage of this approach is that the reference detector and/or second detector can be trained with no manual labeling of a human. This is especially advantageous when dealing with rare anomalies. Consider the example of the anomaly classifier being used to process input signals comprising medical x-ray images of the upper body of human beings. In this example, anomalies may be characterized by image data, with indicates some form of a rare disease in the upper body of a patient.

Gathering enough training data for this example in order to train a supervised classifier would require an immense amount of patients showing the disease. In contrast, the approach presented in the second aspect of the invention does not require an explicit amount of anomaly samples for training the anomaly classifier. Using the example, it would only require images of healthy patients (which would be very easy to obtain due to the disease being rare) and a set of reference images, e.g., a set of x-ray images showing other regions than upper bodies.

Staying with the example, the approach does also not require an expert labeling the images as healthy or not healthy.

In combination, both advantages save a considerable amount of energy due to the reduced necessity of having to record specific data.

In the second aspect, in accordance with an example embodiment of the present invention, the method comprises an additional step of:
Training the second detector using the reference dataset in a supervised fashion and/or training the reference detector (81) using the second dataset in a supervised fashion.

The term "supervised fashion" may be understood as training the second detector and/or the reference detector with more information than is supplied from the raw datasets themselves, e.g., with additional annotations. For example, when using a flow-based model as the second detector it may trained using the reference dataset by adding the following loss term to the training objective:

$$L_o = -\lambda \cdot \log\left(\frac{\sqrt[T]{p_{ref}(x_{ref})}}{\sqrt[T]{p_{ref}(x_{ref})} + \sqrt[T]{p_2(x_{ref})}}\right),$$

where $\lambda$ and $T$ are predefined parameters, $p_{ref}(x_{ref})$ is the likelihood obtained from the reference detector on a sample $x_{ref}$ of the reference dataset and $p_2(x_{ref})$ is the likelihood obtained from the second detector. When minimizing this loss term using the samples of the reference dataset as $x_{ref}$ in addition to the standard loss, it has the effect of the second detector assigning lower likelihood values to elements of the reference dataset. Similarly, the reference detector may be trained with the samples of the second dataset as $x_{ref}$ in order for it to assign lower likelihood values to elements of the second dataset.

Using the loss term presented above can be understood as supervised training as it gives additional information about data from another distribution. The reference detector and/or second detector can leverage this information to gain more knowledge about the respective other distribution. This allows the reference detector and/or second detector to provide even more accurate likelihood values which in turn even further improves the performance of the anomaly classifier.

In the second aspect, in accordance with an example embodiment of the present invention, the step of training the second detector comprises a fine-tuning of the reference detector on the second dataset to obtain a trained second detector.

Fine-tuning is understood as the process of obtaining parameters from a previously trained model and adapting the obtained parameters using a different dataset in order to obtain a second model.

For example, when using a flow-based model as reference detector and another flow-based model as second detector, the reference detector may be trained first using the reference dataset. Then, the second detector can be obtained by copying it and training the copied model on the second dataset. This way, the second detector can be obtained.

An advantage of using a fine-tuning approach is that it greatly increases the performance of the overall anomaly classifier as the second detector is trained with even more data than only the second dataset.

The term "computer" covers any device for the processing of pre-defined calculation instructions. These calculation instructions can be in the form of software, or in the form of hardware, or also in a mixed form of software and hardware.

It is further understood that the procedures cannot only be completely implemented in software as described. They can also be implemented in hardware, or in a mixed form of software and hardware.

Example embodiments of the present invention are discussed with reference to the figures in more detail below.

DETAILED DESCRIPTION OF EXAMPLE EMBODIMENTS

Figure 1:
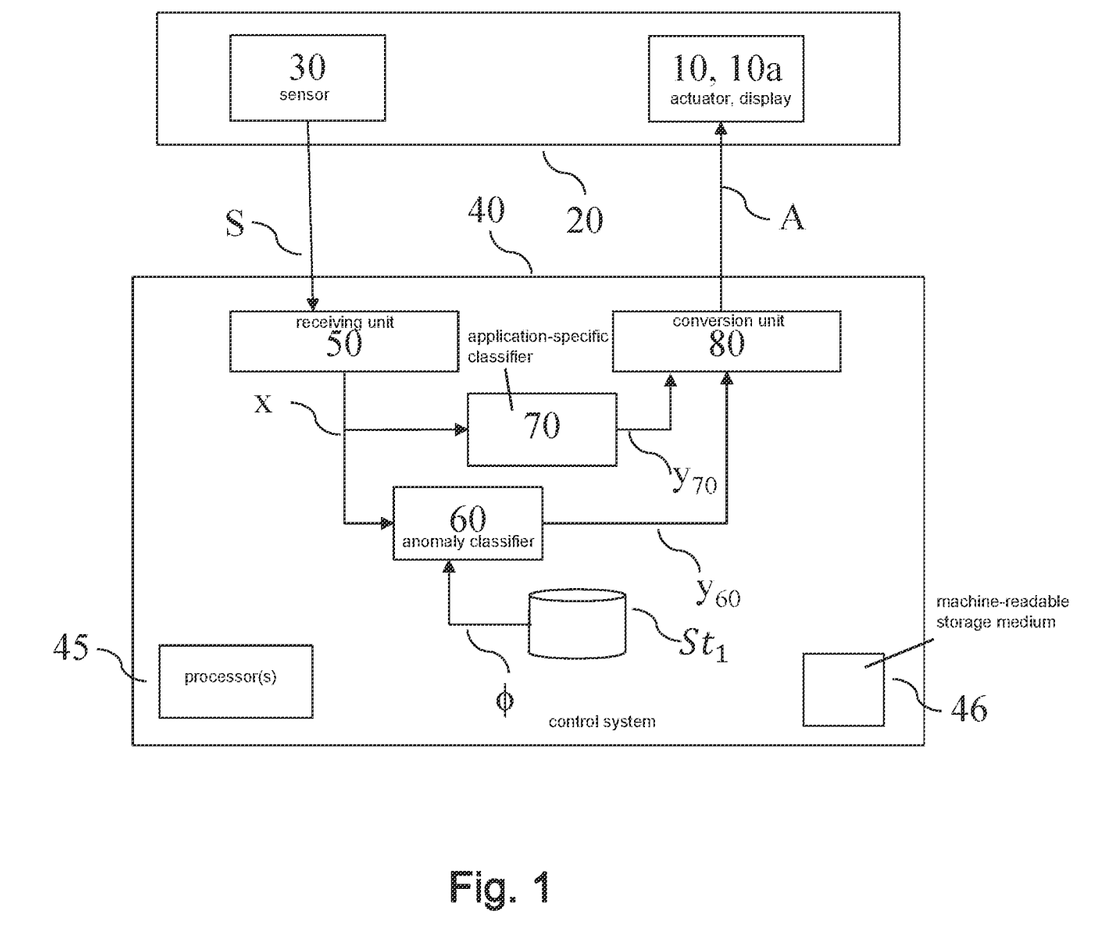
FIG. 1 shows a control system comprising an anomaly classifier controlling an actuator in its environment, in accordance with an example embodiment of the present invention.

Shown in FIG. 1 is an embodiment of an actuator (10) in its environment (20). The actuator (10) interacts with a control system (40). An actuator (10) may be a technical system that is capable of receiving actuator control commands (A) and of acting in accordance with said received actuator control commands (A). The actuator (10) and its environment (20) will be jointly called actuator system. At preferably evenly spaced points in time, a sensor (30) senses a condition of the actuator system. The sensor (30) may comprise several sensors. Preferably, the sensor (30) is an optical sensor that takes images of the environment (20). An output signal (S) of the sensor (30) (or, in case the sensor (30) comprises a plurality of sensors, an output signal (S) for each of the sensors) which encodes the sensed condition is transmitted to the control system (40).

Thereby, the control system (40) receives a stream of sensor signals (S). It then computes a series of actuator control commands (A) depending on the stream of sensor signals (S), which are then transmitted to the actuator (10).

The control system (40) receives the stream of sensor signals (S) of the sensor (30) in an optional receiving unit (50). The receiving unit (50) transforms the sensor signals (S) into a plurality of input signals (x). Alternatively, in case of no receiving unit (50), each sensor signal (S) may directly be taken as an input signal (x). The input signal (x) may, for example, be given as an excerpt from sensor signal (S). Alternatively, the sensor signal (S) may be processed to yield the input signal (x). The input signal (x) may comprise image data corresponding to an image recorded by the sensor (30), or it may comprise audio data, for example if the sensor (30) is an audio sensor. In other words, input signal (x) may be provided in accordance with the sensor signal (S).

The input signal (x) is then passed on to an anomaly classifier (60). The anomaly classifier (60) is parametrized by parameters ($\xi$), which are stored in and provided by a parameter storage ($St_1$).

The anomaly classifier (60) determines one or many output signals ($y_{60}$) from the input signals (x). The output signals ($y_{60}$) comprise information about whether the input signal (x) is anomalous or not. The output signals ($y_{60}$) is transmitted to an optional conversion unit (80), which converts the output signals (y) into the actuator control commands (A). The actuator control commands (A) are then transmitted to the actuator (10) for controlling the actuator (10) accordingly. Alternatively, the output signals ($y_{60}$) may directly be taken as actuator control commands (A).

Alternatively, the control system may comprise a plurality of application classifiers (70), which can determine application specific information, e.g., object detection. The application-specific classifier (70) may provide application output signals ($y_{70}$) to the optional conversion unit (80). The conversion unit (80) may determine the actuator control command based on the application output signal ($y_{70}$) and/or the output signal ($y_{60}$).

The actuator (10) receives the actuator control commands (A), is controlled accordingly and carries out an action corresponding to the actuator control commands (A). The actuator (10) may comprise a control logic, which transforms the actuator control commands (A) into a further control command, which is then used to control the actuator (10).

In further embodiments, the control system (40) may comprise the sensor (30). In even further embodiments, the control system (40) alternatively or additionally may comprise the actuator (10).

In still further embodiments, it may be envisioned that the control system (40) controls a display (10a) additionally or instead of the actuator (10).

Furthermore, the control system (40) may comprise a processor (45) (or a plurality of processors) and at least one machine-readable storage medium (46) on which instructions are stored which, if carried out, cause the control system (40) to carry out a method according to one aspect of the invention.

Figure 2:
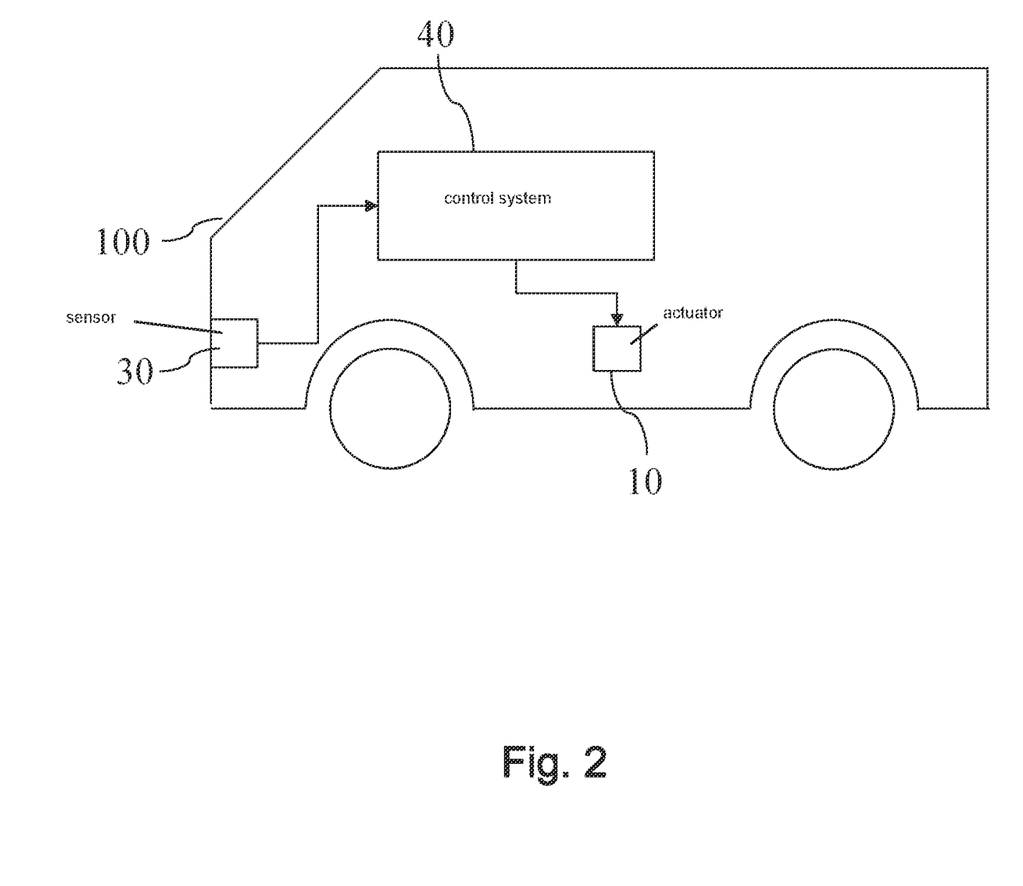
FIG. 2 shows the control system controlling an at least partially autonomous robot, in accordance with an example embodiment of the present invention.

FIG. 2 shows an embodiment in which the control system (40) is used to control an at least partially autonomous robot, e.g., an at least partially autonomous vehicle (100).

The sensor (30) may comprise one or more video sensors and/or one or more radar sensors and/or one or more ultrasonic sensors and/or one or more LiDAR sensors and/or thermal cameras. Some or all of these sensors are preferably but not necessarily integrated in the vehicle (100).

Alternatively or additionally, the sensor (30) may comprise an information system for determining a state of the actuator system. One example for such an information system is a weather information system that determines a present or future state of the weather in the environment (20).

For example, using the input signal (x), the application-specific classifier (70) may detect objects in the vicinity of the vehicle (100) in order to navigate around them. It can be further envisioned that the anomaly classifier (60) may detect that the current input signal (x) or parts thereof are anomalous, for example, that there exists unidentifiable lost cargo on the road in the vicinity of the vehicle (100). The output signals ($y_{60}$) may comprise information that characterizes where the anomalous region or regions are located. The actuator control command (A) may then be determined in accordance with this information, for example, to navigate around the anomalous region or regions. Alternatively, the actuator control command (A) may then be determined such that a plurality of autonomous maneuvers of the vehicle (100) are disabled. It can be further envisioned that the actuator control command (A) may be determined to initiate a handover to driver in order for the driver to resume operation of the vehicle (100).

The actuator (10), which is preferably integrated in the vehicle (100), may be given by a brake and/or a propulsion system and/or an engine and/or a drivetrain and/or a steering of the vehicle (100).

In further embodiments, the at least partially autonomous robot may be given by another mobile robot (not shown), which may, for example, move by flying, swimming, diving or stepping. The mobile robot may, inter alia, be an at least partially autonomous lawn mower, or an at least partially autonomous cleaning robot. In all of the above embodiments, the actuator command control (A) may be determined such that the propulsion unit and/or steering and/or brake of the mobile robot are controlled such that the mobile robot may navigate around regions, which are deemed anomalous by the anomaly classifier (60).

In a further embodiment, the at least partially autonomous robot may be given by a gardening robot (not shown), which uses the sensor (30), preferably an optical sensor, to determine a state of plants in the environment (20) using the application-specific classifier (70). The actuator (10) may control a nozzle for spraying chemicals and/or other liquids. Alternatively or additionally, the actuator may control a cutting device and/or mowing device, e.g., a blade and/or a sickle and/or scissors. Depending on a species and/or a state of the plants as determined by the application-specific classifier (70), an actuator control command (A) may be determined to cause the actuator (10) to spray the plants with a suitable quantity of suitable chemicals and/or liquids. Alternatively or additionally, it can also be envisioned that, depending on the species, the actuator control command (A) is determined as to remove the plant with the cutting device. If the anomaly classifier (60) deems a certain plant as anomalous, the actuator control signal (A) may be determined such that the robot refrains from spraying and/or cutting the plant. Alternatively and/or additionally, it may send information regarding the anomalous plant to a user and/or an operator for manual inspection using, e.g., a display (10*a*). In this scenario, the information may comprise the location of the anomalous plant.

In even further embodiments, the at least partially autonomous robot may be given by a domestic appliance (not shown), like e.g. a washing machine, a stove, an oven, a microwave, or a dishwasher. The application-specific classifier (70) may, e.g., may detect a state of an object that is to undergo processing by the household appliance based on the sensor signal (S) of a sensor (30), e.g., an optical sensor.

For example, in the case of the domestic appliance being a washing machine, the application-specific classifier (70) may detect a state of the laundry inside the washing machine based on the sensor signal (S).

The actuator control commands (A) may then, for example, be determined depending on a detected material of the laundry. It can be further envisioned that if the detected material is considered non-anomalous by the anomaly classifier (60) the actuator control signal (A) may be set such that the washing machine washes the detected material with water of a predefined temperature and with detergent of a predefined amount and/or type. If the detected material is deemed anomalous by the anomaly classifier (60), the actuator control signal (A) may be set such that the washing machine seizes operation and informs a user and/or an operator via a display (10*a*).

Figure 3:
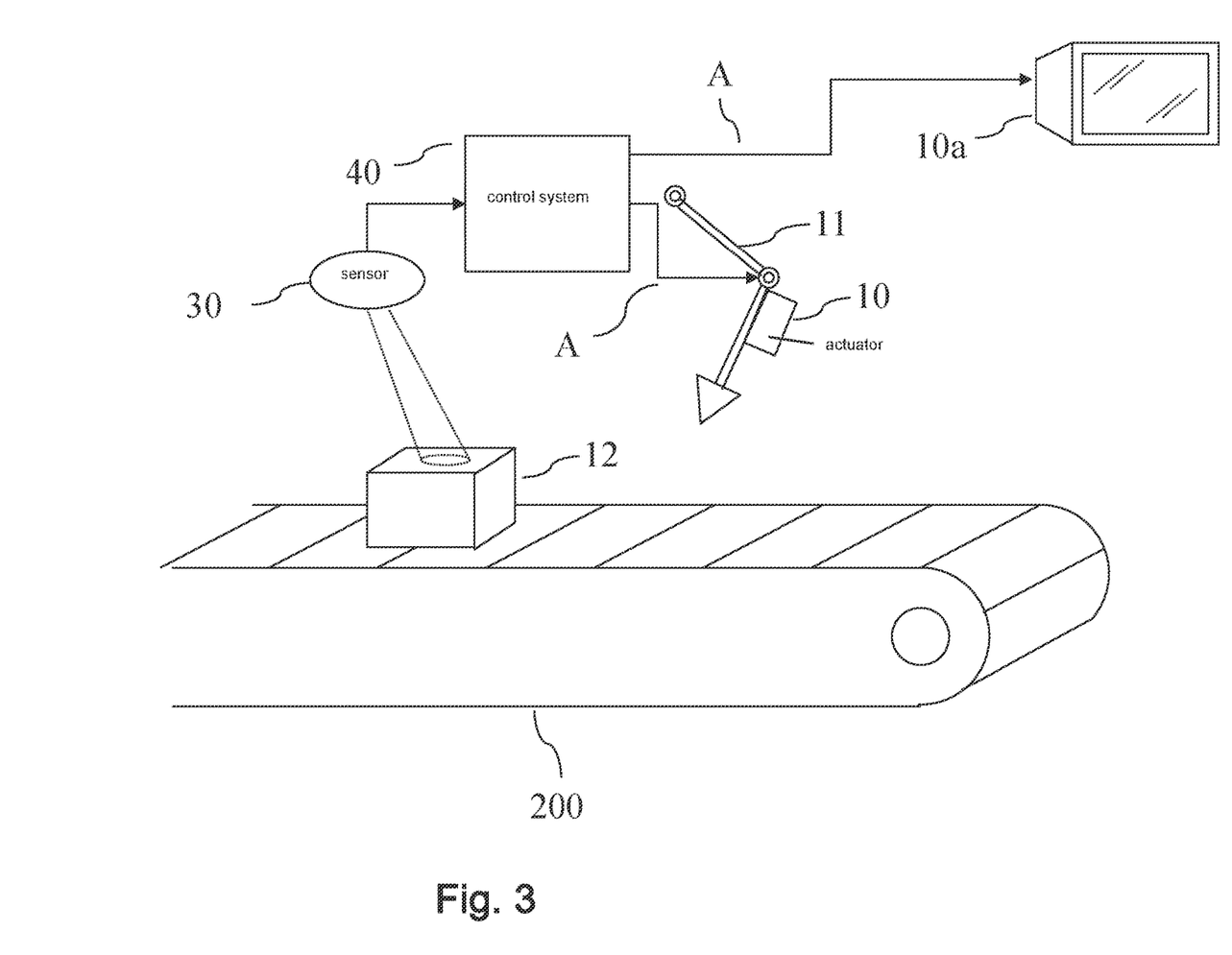
FIG. 3 shows the control system controlling a manufacturing machine, in accordance with an example embodiment of the present invention.

Shown in FIG. 3 is an embodiment in which the control system (40) is used in order to control a manufacturing machine (11, e.g. a punch cutter, a cutter, a gun drill or a gripper) of a manufacturing system (200), e.g. as part of a production line. The control system (40) controls an actuator (10) which in turn controls the manufacturing machine (11).

The sensor (30) may be given by an optical sensor that captures properties of e.g. a manufactured product (12). The anomaly classifier (60) may determine whether the manufactured product (12) is anomalous or not, e.g., whether the manufactured product (12) is faulty or not. The actuator (10) which controls the manufacturing machine (11) may then be controlled depending on the determined state of the manufactured product (12) for a subsequent manufacturing step of manufactured product (12). For example, it may abort the subsequent manufacturing step and inform an operator via a display (10*a*). Alternatively, the actuator (10) may be controlled to select a manufactured product (12) that has been identified as anomalous by the classifier (60) sort it into a designated bin, where they may be re-checked before discarding them.

Figure 4:
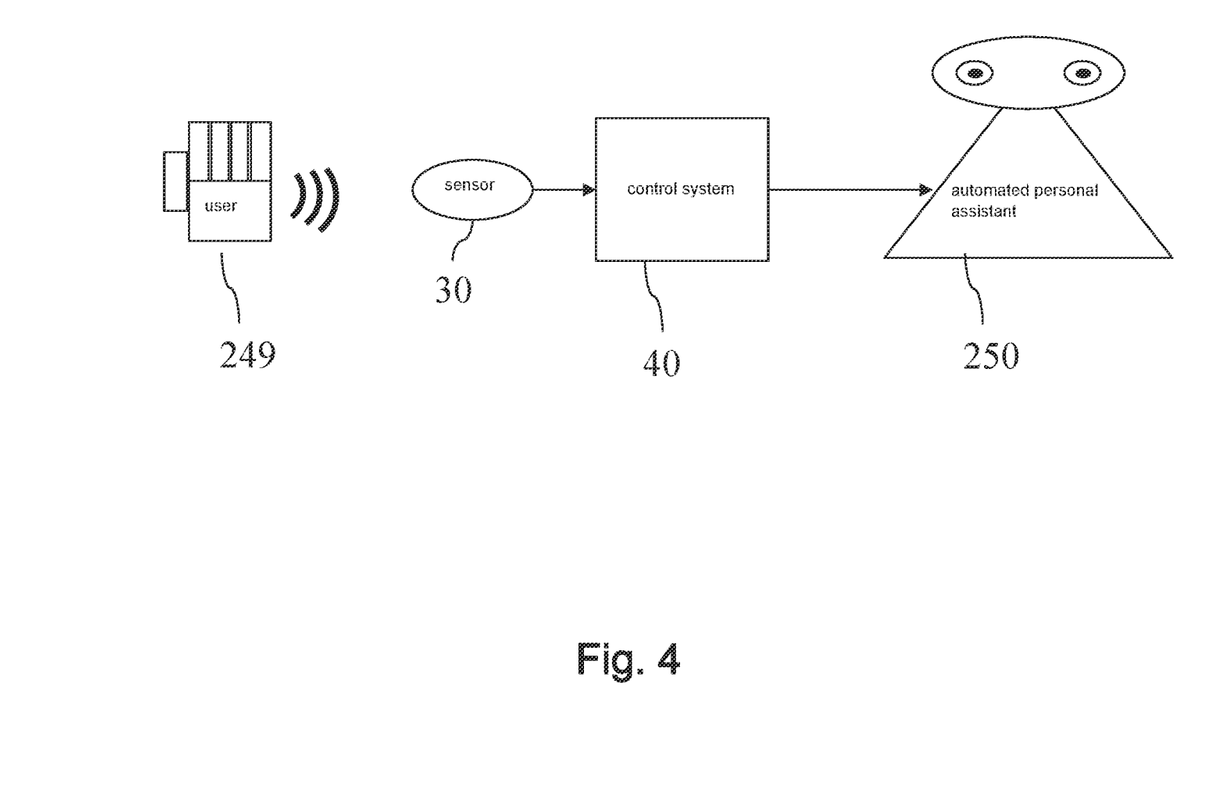
FIG. 4 shows the control system controlling an automated personal assistant, in accordance with an example embodiment of the present invention.

Shown in FIG. 4 is an embodiment in which the control system (40) is used for controlling an automated personal assistant (250). The sensor (30) may be an audio sensor e.g. for receiving a voice command of the user (249) as an audio signal. The application-specific classifier (70) may be configured to recognize certain voice commands. It can be further envisioned that the anomaly classifier (60) is configured to detect anomalous voice commands, e.g., voice commands by an unauthorized user.

The control system (40) then determines the actuator control commands (A) for controlling the automated personal assistant (250). The actuator control commands (A) are determined in accordance with the sensor signal (S) of the sensor (30). The sensor signal (S) is transmitted to the control system (40). For example, the application-specific classifier (70) may be configured to detect a certain voice command made by the user (249). The control system (40) may then determine an actuator control command (A) for transmission to the automated personal assistant (250). It then transmits said actuator control command (A) to the automated personal assistant (250).

For example, the actuator control command (A) may be determined in accordance with the identified voice command. It may then comprise information that causes the automated personal assistant (250) to retrieve information from a database and output this retrieved information in a form suitable for reception by the user (249). It can be further envisioned that if the voice command is deemed anomalous by the anomaly classifier, the automated personal assistant may reject the voice command.

In further embodiments of the present invention, it may be envisioned that instead of the automated personal assistant (250), the control system (40) controls a domestic appliance (not shown) in accordance with the identified voice command. The domestic appliance may be a washing machine, a stove, an oven, a microwave or a dishwasher.

Figure 5:
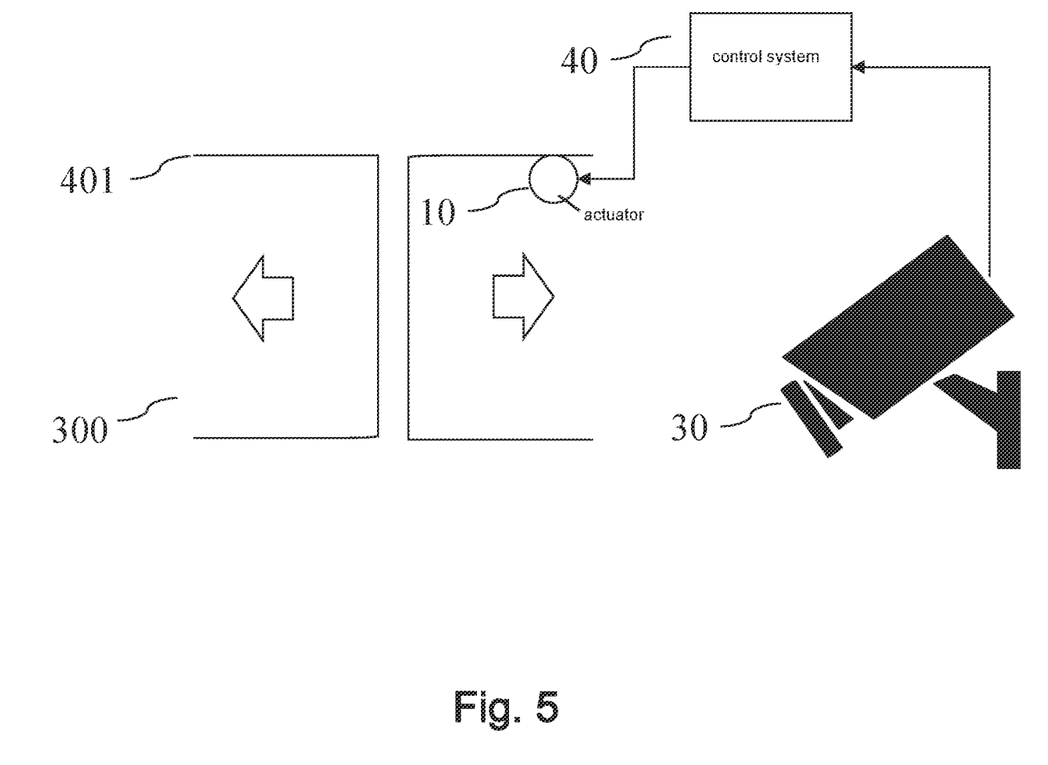
FIG. 5 shows the control system controlling an access control system, in accordance with an example embodiment of the present invention.

Shown in FIG. 5 is an embodiment of the present invention in which the control system (40) controls an access control system (300). The access control system (300) may be designed to physically control access. It may, for example, comprise a door (401). The sensor (30) is configured to sense a scene that is relevant for deciding whether access is to be granted or not. It may for example be an optical sensor for providing image or video data to the application-specific classifier (70). It can be further envisioned that the application-specific classifier (70) is configured to detect a person's face. The control system may be configured to interpret this image or video data e.g. by matching identities with known people stored in a database, thereby determining an identity of the person. Additionally, the anomaly classifier (60) may be configured such that it detects anomalous sensor recordings. The actuator control signal (A) may then be determined depending on the interpretation of the application-specific classifier (70), e.g. in accordance with the determined identity, as well as the classification of the anomaly classifier (60). The access may, for example, be not granted to an authorized person detected by the application-specific classifier (60) if the anomaly classifier (70) deems the scene anomalous. The actuator (10) may be a lock that grants access or not depending on the actuator control signal (A). A non-physical, logical access control is also possible.

Figure 6:
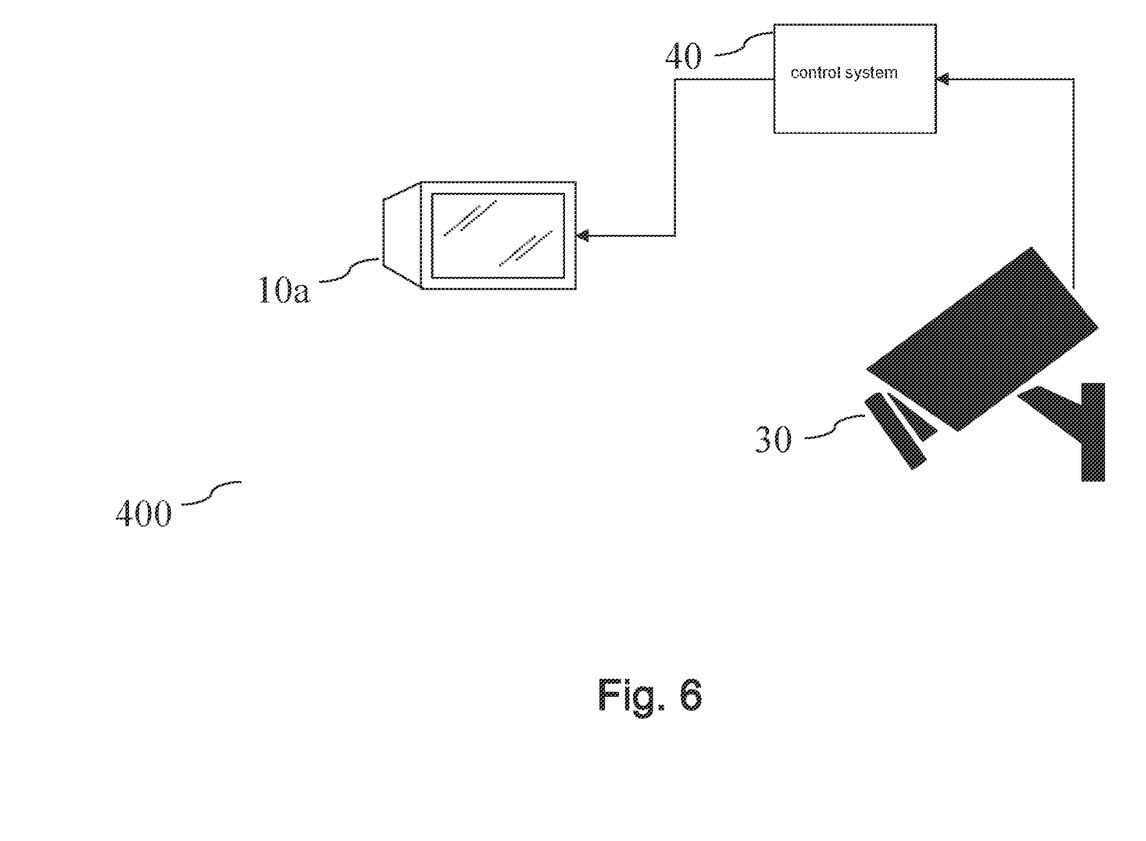
FIG. 6 shows the control system controlling a surveillance system, in accordance with an example embodiment of the present invention.

Shown in FIG. 6 is an embodiment of the present invention in which the control system (40) controls a surveillance system (400). This embodiment is largely identical to the embodiment shown in FIG. 5. Therefore, only the differing aspects will be described in detail. The sensor (30) is configured to detect a scene that is under surveillance. The control system (40) does not necessarily control an actuator (10), but can also control a display (10a). For example, the application-specific classifier (70) may be configured to detect persons. It can further be envisioned that the anomaly classifier (60) determines whether the scene or parts of the scene are anomalous. The actuator control signal (A), which is transmitted to the display (10a), may then, e.g., be configured to cause the display (10a) to adjust the displayed content dependent on the determined classification, e.g. to highlight an object that is deemed anomalous by the anomaly classifier (60).

Figure 7:
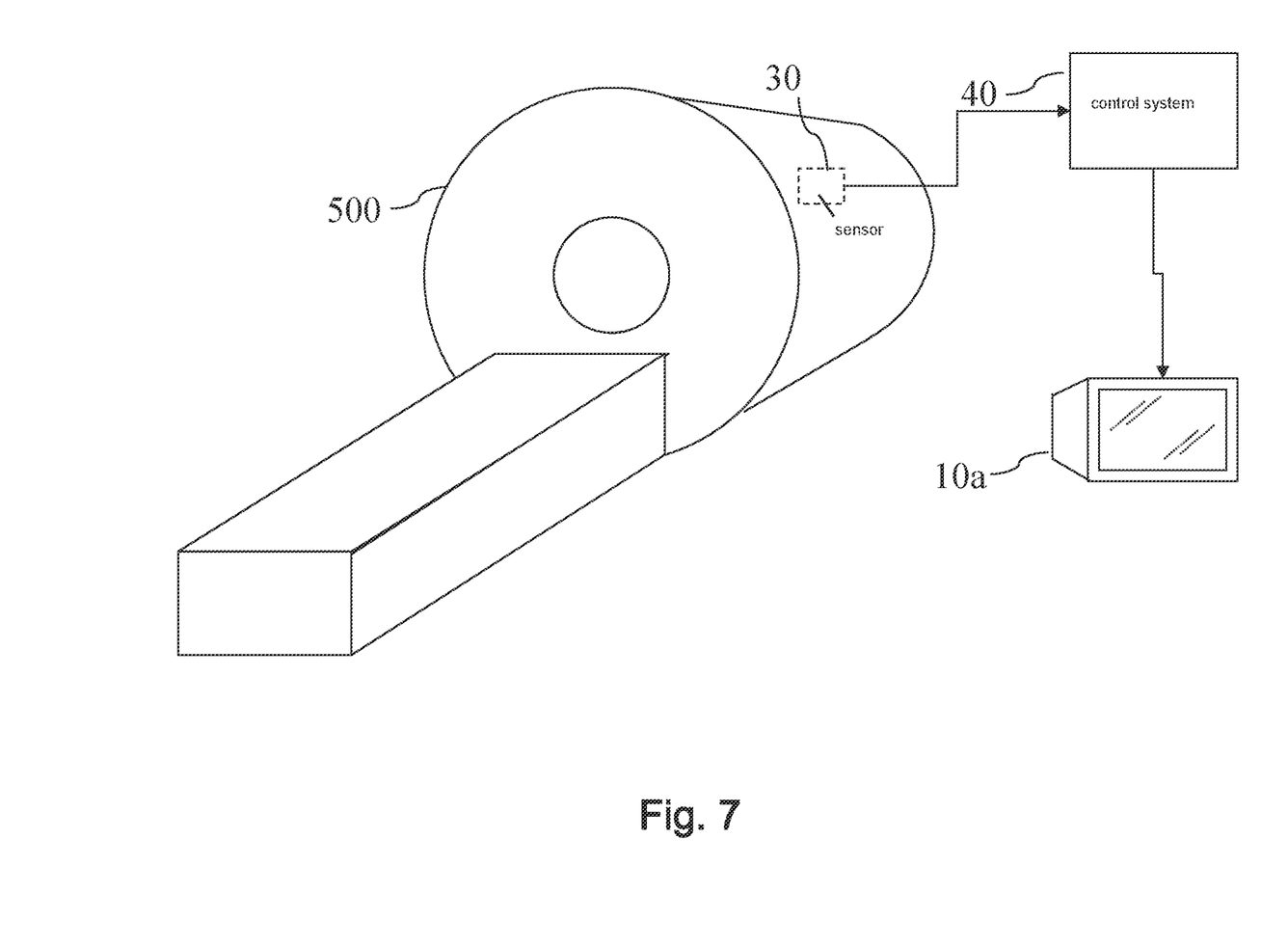
FIG. 7 shows the control system controlling an imaging system, in accordance with an example embodiment of the present invention.

Shown in FIG. 7 is an embodiment of the control system (40) for controlling an imaging system (500), e.g., an MRI apparatus, x-ray imaging apparatus, a PET imaging apparatus or ultrasonic imaging apparatus. The sensor (30) may, for example, be an imaging sensor. The anomaly classifier (60) may then determine whether a sensed image or at least parts of it are anomalous. For example, the anomaly classifier (60) may determine whether an MRI image comprises anomalous parts, which may be indicative of a medical condition. The actuator control signal (A) may then be chosen in accordance with this classification, thereby controlling a display (10a). For example, the anomaly classifier (60) may determine a region of the sensed image to be anomalous. In this case, the actuator control signal (A) may be determined to cause the display (10a) to display the obtained image and highlighting the anomalous region.

Figure 8:
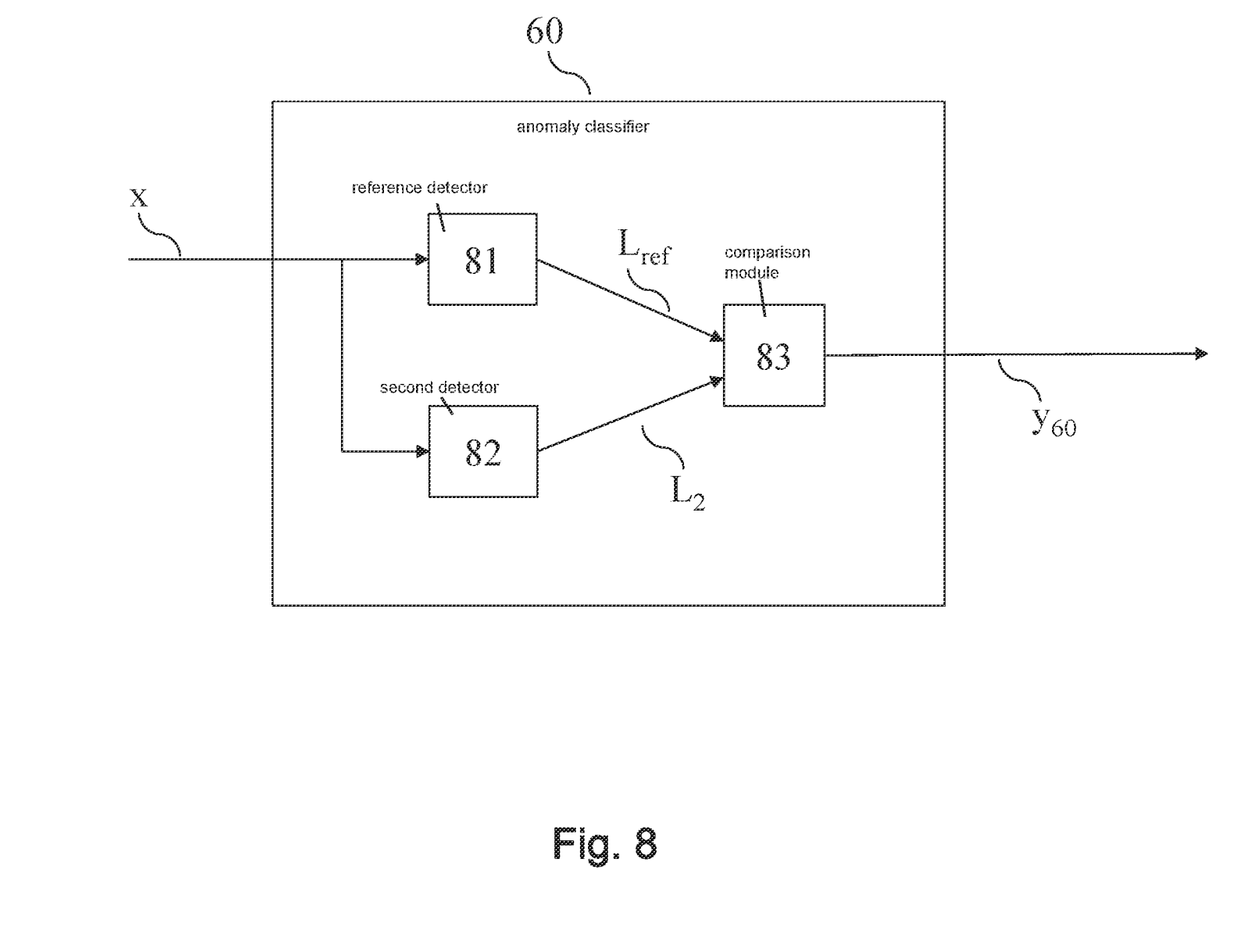
FIG. 8 shows a flow chart diagram of the anomaly classifier, in accordance with an example embodiment of the present invention.

FIG. 8 shows a schematic flow chart of the anomaly classifier (60). It receives the input signal (x) and forwards it to a reference detector (81) and a second detector (82). The reference detector (81) and/or second detector (82) may be generative models, e.g., flow-based models such as GLOW or RealNVP. In a further embodiment, it can be envisioned that the generative model is a variational auto-encoder- The input signal (x) may, for example, comprise camera-based image data. In this case, the reference detector (81) may be configured in order to characterize a reference distribution of images with a large variety in content. This can be achieved by the reference detector (81) having been trained on a large and diverse dataset of natural images such as, e.g., the ImageNet dataset.

In further embodiments, the input signal (x) comprises audio data such as, e.g., recorded with a microphone. In this case, the reference detector (81) may be configured in order to characterize a reference distribution of audio sequences with a variety of different content. This can be achieved by the reference detector (81) having been trained on a large and diverse dataset of natural audio sequences, e.g., the DCASE dataset.

The second detector (82) can be configured in order to characterize the distribution of a specific dataset. For example, when using the anomaly classifier (60) as part of the perception pipeline of an at least partially autonomous vehicle (100) the second detector may be configured to characterize the distribution of images from a dataset recorded in typical driving situations. This can be achieved by the second detector (82) having been trained on a sample dataset of images of typical driving situations.

In a further embodiment, the input signal (x) comprises audio data. In this case, the second detector (82) can be configured in order to characterize a specific distribution of audio data. For example, when using the anomaly classifier (60) as part of a microphone-based control pipeline of an automated assistant device, e.g., a mobile robot, the second detector (82) can be trained with audio sequences of typical voice commands.

The reference detector (81) provides a reference value ($L_{ref}$) which can be viewed as a measure for how likely it is that the input signal (x) belongs to the reference data distribution. Likewise, the second detector (82) provides a second value ($L_2$), which can be viewed as a measure for how likely it is that the input signal (x) belongs to the second distribution. If the reference detector (81) and the second detector (82) comprise generative models, the reference value ($L_{ref}$) and second value ($L_2$) can be likelihood values as obtained by the respective detector. In further embodiments, it can be envisioned that the reference value ($L_{ref}$) and second value ($L_2$) are log-likelihood values as obtained by the respective detector. In even further embodiments, it can be envisioned that the reference value ($L_{ref}$) and second value ($L_2$) are a measure of bits-per-dimension, obtained by transforming the respective log-likelihood values into this metric.

The reference value ($L_{ref}$) and second value ($L_2$) are then provided to a comparison module (83). In the comparison module, it can determined whether the reference value ($L_{ref}$) is larger than the second value ($L_2$). If this is the case, the output signal ($y_{60}$) may be determined such that it characterizes a classification of the input signal (x) as anomalous. If the reference value ($L_{ref}$) is smaller than the second value ($L_2$), the output signal ($y_{60}$) may be determined such that it characterizes a classification of the input signal (x) as non-anomalous.

In further embodiments, in the comparison module (83), it is determined whether the reference value ($L_{ref}$) is larger than the second value ($L_2$) by a predefined margin. If this is the case, the output signal ($y_{60}$) may be determined such that it characterizes a classification of the input signal (x) as anomalous. If the reference value ($L_{ref}$) is not larger than the second value ($L_2$) by the predefined margin, the output signal ($y_{60}$) may be determined such that it characterizes a classification of the input signal (x) as non-anomalous.

What is claimed is:

1. A computer-implemented method for classifying whether an input signal, which includes image data and/or audio data, is anomalous or not with respect to a second data distribution using an anomaly classifier, wherein the anomaly classifier uses a reference detector and a second detector, the method comprising the following steps:
    providing the input signal to the anomaly classifier;
    in the anomaly classifier, providing the input signal to the reference detector and the second detector, wherein the reference detector includes a generative model of a reference data distribution and the second detector includes a generative model of the second data distribution;
    obtaining a reference value from the reference detector based on the input signal, wherein the reference value characterizes a likelihood of the input signal belonging to the reference data distribution;
    obtaining a second value from the second detector based on the input signal, wherein the second value characterizes a likelihood of the input signal belonging to the second data distribution; and
    providing an output signal which characterizes a classification of the input signal as anomalous or not, based on a comparison of the reference value and the second value;
    wherein the likelihood of belonging to the reference distribution is obtained based on a likelihood of one or multiple intermediate representations of the reference detector and/or the likelihood of belonging to the second distribution is obtained based on a likelihood of one or intermediate representations of the second detector.

2. The method according to claim 1, wherein:
    the second data distribution is limited to data of one or more domains;
    the reference data distribution includes data of the one or more domains and of one or more additional domains; and
    the output signal characterizes the classification of the input signal as anomalous or not depending on whether the reference value exceeds the second value by a predefined margin value.

3. The method according to claim 1, wherein the reference detector includes a flow-based machine-learning model and/or the second detector includes a flow-based generative machine-learning model.

4. The method according to claim 1, wherein the anomaly classifier is used to supervise an application-specific classifier, the application-specific classifier having been trained with data from the second data distribution and receives the input signal.

5. The method according to claim 1, wherein the input signal is based on a sensor signal including data from a sensor and/or an actuator control signal is determined based on the output signal of the anomaly classifier for controlling an actuator.

6. The method according to claim 1, wherein an actuator control signal is determined based on the output signal of the anomaly classifier for controlling an actuator that controls a robot that is at least partially autonomous and/or a manufacturing machine and/or an access control system and/or an automated personal assistant and/or a surveillance system and/or an imaging system.

7. The method according to claim 1, wherein the reference detector to which the input signal is provided is one that had been trained on a sample of the reference data distribution in unsupervised fashion, and the second detector to which the input signal is provided is one that had been trained on a sample of the second data distribution in unsupervised fashion.

8. The method according to claim 7, wherein the reference detector to which the input signal is provided is one that had been trained additionally on the sample of the second data distribution in supervised fashion.

9. The method according to claim 7, wherein the second detector to which the input signal is provided is one that had been trained additionally on the sample of the reference data distribution in supervised fashion.

10. The method according to claim 7, wherein the second detector to which the input signal is provided is one that had been trained additionally by a fine-tuning of the reference detector based on the sample of the second data distribution.

11. An anomaly classifier for classifying an input signal, which includes image data and/or audio data using a reference detector and a second detector, wherein, for the classifying, the anomaly classifier performs the following:
    receives the input signal;
    in the anomaly classifier, provides the input signal to the reference detector and the second detector, wherein the reference detector includes a generative model of a reference data distribution and the second detector includes a generative model of a second data distribution;
    obtains a reference value from the reference detector based on the input signal, wherein the reference value characterizes a likelihood of the input signal belonging to the reference data distribution;
    obtains a second value from the second detector based on the input signal, wherein the second value characterizes a likelihood of the input signal belonging to the second data distribution; and
    provides an output signal which characterizes a classification of the input signal as anomalous or not based on a comparison of the reference value and the second value;
    wherein the likelihood of belonging to the reference distribution is obtained based on a likelihood of one or multiple intermediate representations of the reference detector and/or the likelihood of belonging to the second distribution is obtained based on a likelihood of one or intermediate representations of the second detector.

12. The anomaly classifier according to claim 11, wherein the anomaly classifier is configured to provide the output signal to a controller for accordingly operating an actuator.

13. The anomaly classifier according to claim 11, wherein the reference detector to which the input signal is provided is one that had been trained on a sample of the reference data distribution in unsupervised fashion, and the second detector to which the input signal is provided is one that had been trained on a sample of the second data distribution in unsupervised fashion.

14. A method comprising:
    training a reference detector of an anomaly classifier in an unsupervised fashion on a reference dataset; and
    training a second detector of the anomaly classifier in an unsupervised fashion on a second dataset;

wherein:
the reference detector includes a generative model of a reference data distribution;
the second detector includes a generative model of a second data distribution;
the reference dataset is a sample of the reference data distribution;
the second dataset is a sample of the second data distribution;
to classify whether an input signal, which includes image data and/or audio data, is anomalous or not with respect to the second data distribution, the anomaly classifier:
receives the input signal;
in the anomaly classifier, provides the input signal to the trained reference detector and the trained second detector;
obtains, from the trained reference detector and based on the input signal, a reference value that characterizes a likelihood of the input signal belonging to the reference data distribution,
obtains, from the trained second detector and based on the input signal, a second value that characterizes a likelihood of the input signal belonging to the second data distribution; and
provides an output signal which characterizes a classification of the input signal as anomalous or not based on a comparison of the reference value and the second value; and
at least one of:
the likelihood of belonging to the reference distribution is obtained based on a likelihood of one or multiple intermediate representations of the reference detector; and
the likelihood of belonging to the second distribution is obtained based on a likelihood of one or intermediate representations of the second detector.

15. The method according to claim 14, further comprising the following step:
training the second detector using the reference dataset in a supervised fashion and/or training the reference detector using the second dataset in a supervised fashion.

16. The method according to claim 14, wherein the step of training the second detector includes fine-tuning the reference detector on the second dataset to obtain a trained second detector.

17. A non-transitory machine-readable storage medium on which is stored a computer program for classifying an input signal, which includes image data and/or audio data, is anomalous or not with respect to a second data distribution using an anomaly classifier, wherein the anomaly classifier uses a reference detector and a second detector, the computer program, when executed by a computer, causing the computer to perform the following steps:
providing the input signal to the anomaly classifier;
in the anomaly classifier, providing the input signal to the reference detector and the second detector, wherein the reference detector includes a generative model of a reference data distribution and the second detector includes a generative model of the second data distribution;
obtaining a reference value from the reference detector based on the input signal, wherein the reference value characterizes a likelihood of the input signal belonging to the reference data distribution;
obtaining a second value from the second detector based on the input signal, wherein the second value characterizes a likelihood of the input signal belonging to the second data distribution; and
providing an output signal which characterizes a classification of the input signal as anomalous or not based on a comparison of the reference value and the second value;
wherein the likelihood of belonging to the reference distribution is obtained based on a likelihood of one or multiple intermediate representations of the reference detector and/or the likelihood of belonging to the second distribution is obtained based on a likelihood of one or intermediate representations of the second detector.

18. A control system for operating an actuator, comprising:
an anomaly classifier that classifies whether an input signal, which includes image data and/or audio data, is anomalous or not with respect to a second data distribution;
wherein:
to perform the classification, the anomaly classifier:
receives the input signal;
in the anomaly classifier, provides the input signal to:
a reference detector that includes a generative model of a reference data distribution; and
a second detector that includes a generative model of the second data distribution;
obtains, from the reference detector and based on the input signal, a reference value that characterizes a likelihood of the input signal belonging to the reference data distribution;
obtains, from the second detector and based on the input signal, a second value that characterizes a likelihood of the input signal belonging to the second data distribution; and
provides an output signal which characterizes a classification of the input signal as anomalous or not based on a comparison of the reference value and the second value;
at least one of:
the likelihood of belonging to the reference distribution is obtained based on a likelihood of one or multiple intermediate representations of the reference detector; and
the likelihood of belonging to the second distribution is obtained based on a likelihood of one or intermediate representations of the second detector;
the reference detector is trained in an unsupervised fashion on a reference dataset;
the reference dataset is a sample of the reference data distribution;
the second detector is trained in an unsupervised fashion on a second dataset;
the second dataset is a sample of the second data distribution; and
the control system is configured to operate the actuator in accordance with the output signal of the anomaly classifier.

19. A training system configured to:
train a reference detector of an anomaly classifier in an unsupervised fashion on a reference dataset; and
train a second detector of the anomaly classifier in an unsupervised fashion on a second dataset;
wherein:
the reference detector includes a generative model of a reference data distribution;

the second detector includes a generative model of a second data distribution;
the reference dataset is a sample of the reference data distribution;
the second dataset is a sample of the second data distribution;
to classify whether an input signal, which includes image data and/or audio data, is anomalous or not with respect to the second data distribution, the anomaly classifier:
  receives the input signal;
  in the anomaly classifier, provides the input signal to the trained reference detector and the trained second detector;
  obtains, from the reference detector and based on the input signal, a reference value that characterizes a likelihood of the input signal belonging to the reference data distribution;
  obtains, from the second detector and based on the input signal, a second value that characterizes a likelihood of the input signal belonging to the second data distribution and
  provides an output signal which characterizes a classification of the input signal as anomalous or based on a comparison of the reference value and the second value; and
at least one of:
  the likelihood of belonging to the reference distribution is obtained based on a likelihood of one or multiple intermediate representations of the reference detector; and
  the likelihood of belonging to the second distribution is obtained based on a likelihood of one or intermediate representations of the second detector.

* * * * *